United States Patent Office 3,739,038
Patented June 12, 1973

3,739,038
STILBENE PRODUCTION
Raymond A. Franz, Kirkwood, Phillip D. Montgomery, Creve Coeur, and Herbert J. Gebhart, Jr., Ferguson, Mo., assignors to Monsanto Company, St. Louis, Mo.
No Drawing. Filed June 8, 1971, Ser. No. 150,921
Int. Cl. C07c 5/20
U.S. Cl. 260—668 R
10 Claims

ABSTRACT OF THE DISCLOSURE

This application describes a process for the conversion of bibenzyl and/or bibenzyl derivatives in the presence of oxygen and a halogen to produce stilbene and/or stilbene derivatives.

BACKGROUND OF THE INVENTION

This invention relates to the manufacture of silbene (1,2-diphenylethylene) and derivatives thereof.

Stilbene, because of its unsaturated character, is very reactive and may be employed in various organic syntheses. It is useful in the production of products which may be used in the manufacture of dyes, paints and resins. It is also useful as optical brighteners, in pharmaceuticals and as organic intermediates.

Heretofore, stilbene has not been available in commercial quantities because the attendant yields of the known processes for the manufacture of stilbene have been generally small. Stilbene has been produced by the dehydrogenation of bibenzyl using a catalyst comprising alumina and tungsten oxide (U.S. Pat. No. 2,361,044).

In U.S. Pat. No. 2,890,253, a dehydrogenation process is disclosed wherein certain hydrocarbons are converted to less saturated hydrocarbons by heating a vaporized mixture of hydrocarbon feed with at least 0.1 mol of elemental iodine per mol of feed and oxygen in a quantity which does not exceed one molecular weight proportion of oxygen per atomic weight proportion of iodine.

In U.S. Pat. No. 3,247,273, a dehydrogenation process is disclosed wherein certain alkyl aromatic compounds are converted to the corresponding alkenyl aromatic compounds by heating a vaporized mixture of an alkyl aromatic compound with about 0.5 to about 1.5 mols of oxygen per mol of compound and an amount of an iodine liberating material greater than the equivalent of 0.02 to 0.07 mol of iodine per mol of compound while maintaining the partial pressure of the alkyl aromatic compound less than one-fifth atmosphere at a total pressure of one atmosphere.

In U.S. Pat. No. 3,205,280, a catalytic dehydrogenation process is disclosed wherein certain hydrocarbons are converted to less saturated hydrocarbons by heating a mixture of a hydrocarbon with at least 0.001 mol of a halogen per mol of hydrocarbon in the presence of free oxygen and a solid catalyst of an alkali metal halide and silver halide and additionally oxides and halides of certain elements.

In U.S. Pat. No. 3,522,323, a two-stage oxydehydrogenation process is disclosed wherein certain hydrocarbons are converted to less saturated hydrocarbons by passing the hydrocarbon, a halogen and oxygen through a first reaction zone which is empty or contains a substance inert to reaction with a halogen and then through a second reaction zone containing a catalyst.

In copending application Ser. No. 393, filed Jan. 2, 1970, a dehydrocoupling process is disclosed and claimed wherein toluene is converted to stilbene by a vapor phase reaction in the presence of oxygen and a halogen.

SUMMARY

This invention is directed to a vapor phase process for converting bibenzyl (1,2-diphenylethane) to stilbene (1,2-diphenylethylene).

Accordingly, typical objects of this invention are to provide: (1) an improved vapor phase process for the production of stilbene and derivatives thereof and (2) a vapor phase dehydrogenation process for converting bibenzyl and bibenzyl derivatives to stilbene and stilbene derivatives.

Other objects, aspects and advantages of this invention will become apparent to those skilled in the art upon further study of this disclosure and the appended claims.

In accordance with this invention bibenzyl and bibenzyl derivatives are dehydrogenated in a one step process to stilbene and stilbene derivatives by a vapor phase reaction in the presence of oxygen and a halogen. The molar ratio of bibenzyl and/or bibenzyl derivative:oxygen is in the range of about 1:0.1 to 1:1 and preferably is in the range of about 1:0.3 to 1:0.7. The molar ratio of bibenzyl and/or bibenzyl derivative:halogen (measured as elemental halogen) is in the range of about 1:0.0001 to 1:0.015 and preferably is in the range of about 1:0.001 to 1:0.01.

Any source of oxygen, pure or in admixture with inerts, may be employed in the process of this invention. Air is a satisfactory source of oxygen for use in this invention.

The halogen employed in the process of this invention can be chlorine, bromine, iodine, or mixtures thereof. The selected halogen may be introduced as elemental halogen and/or halogen compounds, such as hydrogen halide, ammonium halide, organic halides or any halogen-containing compound which decomposes to atomic halogen under the reaction conditions. Useful organic halides in this invention are, for example, alkyl halides such as methyl chloride, methyl bromide, methyl iodide, the ethyl halides, the butyl halides, and the like; iodoform; and aromatic halides such as chlorobenzene, bromobenzene, iodobenzene, and the like. Any of the above halogens or halogen compounds may be employed in the invention individually or in mixtures of two or more.

As previously stated, the process of this invention is carried out as a vapor phase reaction. Accordingly, any apparatus of the type suitable for carrying out chemical reactions in the vapor phase may be employed for the practice of this invention. The reactor may contain a heat carrier material such as alpha-alumina.

The process of this invention may be operated continuously or intermittently and is carried out at a temperature in the range of from about 500° C. to about 750° C. Preferably, the reaction is conducted as a continuous operation and at a temperature in the range of from about 550° C. to about 650° C.

Pressures other than atmospheric may be employed in the process of this invention, however, it will generally be preferred to conduct the reaction at or near atmospheric pressure.

The reaction time for the process of this invention may be selected from a broad operable range which may vary from about 0.1 to about 60 seconds. The reaction time may be defined as the length of time in seconds which the reactant gases measured under reaction conditions are in contact in the reactor. Preferably, the reaction time will be within the range of 0.5 to 20 seconds.

The reactor employed may be brought to the desired reactor temperature before or after introduction of the vaporized reactants. Preferably, the feed materials are preheated, vaporized and generally thoroughly mixed prior to introducing them to the reactor.

The products of the reaction may be recovered from the effluent gas by any appropriate method and means known to the art and further elucidation here will be unnecessary duplication of the art. The unreacted bibenzyl and/or bibenzyl derivatives are recovered and recirculated to the process. Also, the halogen or halogen source is recovered and recirculated to the process.

In addition to the presence of bibenzyl and/or bibenzyl derivatives, oxygen and halogen in the process of this invention, any inert material such as nitrogen, helium, and the like may be present. The inert material may be introduced to the process alone or may be combined with the other materials as feed. Also, water or steam may be present during the reaction and may be introduced to the process alone or with the other materials as feed.

In another aspect of the present invention, toluene and/or toluene derivatives may be present, in the bibenzyl and/or bibenzyl derivatives feed stream. Accordingly, a stream containing bibenzyl and toluene obtained from the process of said copending application Ser. No. 393 may be the feed stream for the production of stilbene.

DESCRIPTION OF PREFERRED EMBODIMENTS

The following example is given as illustrative of the invention and, as such, specifics set forth are not intended to be unduly considered limitations upon the scope of the invention. The reactor used is a tubular system fabricated from 96% quartz tubing. The tube has an outside diameter of 15 mm. and a length of 49.5 centimeters. The tubular reactor unit is supported in a vertical tube furnace. A 6 millimeter outside diameter thermowell is located in the center of the reactor. The reactor is filled with a packing material. Prior to entering the reactor, the reactants are vaporized and introduced into the upper portion, preheat section, of the reactor. The effluent gases from the reactor are chromatographically analyzed.

Example

A mixture of bibenzyl, oxygen, elemental iodine and nitrogen in a molar ratio of 1:0.5:0.005:3.5 is preheated and introduced into the preheater section of the reactor. The reactor is filled with a commercial alpha-alumina packing material.[1] The reactant gases pass through the reactor at a temperature of 600° C. and at such a rate to provide a 5 second reaction time. Chromatographic analysis of the effluent shows a bibenzyl conversion of 91.0% with a yield of stilbene of 89.0 weight percent and 8.33 mol percent of $CO+CO_2$.

From the foregoing example it is readily apparent to those skilled in the art that the above-described process exhibits excellent selectivity and yields of stilbene.

The reaction of this invention may be conducted for any sufficient length of time to provide a desired conversion. Generally, the best result of desired products will be obtained when the conversion of mol feed is between 25 and 75 percent or higher.

It will be obvious to persons skilled in the art that various modifications may be made in the process as described in this application. Accordingly, it is intended that all such modifications which reasonably fall within the scope of the appended claims are included herein.

We claim:

1. The method of preparing 1,2-diphenylethylene and derivatives thereof which consists of contacting in the vapor phase at a temperature in the range of about 500° C. to about 750° C., bibenzyl and/or derivatives thereof and oxygen in a molar ratio of about 0.1 to about 1.0 mol of oxygen per mol of bibenzyl and/or derivatives thereof and at least one halogen in either elemental or compound form in a molar ratio of up to 0.015 mol of the halogen (measured as elemental halogen) per mol of bibenzyl.

2. The method of claim 1 wherein said contacting is conducted for a period of from about 0.1 to about 60 seconds.

3. The method of claim 1 wherein said halogen is present as elemental iodine.

4. The method of claim 1 wherein said halogen is introduced as a volatile halogen compound.

5. The method of claim 4 wherein said volatile halogen compound is hydrogen iodide.

6. The method of claim 1 wherein said contacting is conducted until at least 25 percent conversion of said phenylmethane is obtained.

7. The method of claim 1 wherein air is used as the source of oxygen.

8. The method of claim 1 wherein said halogen is introduced as ammonium iodide.

9. The method of claim 1 conducted in the presence of a heat carrier packing material.

10. The method of claim 9 wherein said material is alpha-alumina.

References Cited

UNITED STATES PATENTS 3,522,323   7/1970   Duke et al. _____ 260—668

CURTIS R. DAVIS, Primary Examiner

U.S. Cl. X.R.

260—668 C, 668 D, 669

---

[1] A commercial alpha-alumina packing material having a typical chemical analysis of

| Component: | Percent |
|---|---|
| $Al_2O_3$ | 99.28 |
| $SiO_2$ | 0.05 |
| $Fe_2O_3$ | 0.15 |
| $TiO_2$ | 0.02 |
| $Na_2O$ | 0.50 | and characterized as Crystal form—alpha-alumina; chemical nature—amphoteric; true specific gravity—3.97; packing density—approx. 107–119 lb./cu. ft.; hardness (Knoop)—2000 (Mohs)—9.0.